United States Patent
Lee et al.

(10) Patent No.: US 12,537,199 B2
(45) Date of Patent: Jan. 27, 2026

(54) NEGATIVE ELECTRODE ACTIVE MATERIAL, AND NEGATIVE ELECTRODE AND SECONDARY BATTERY WHICH INCLUDE THE SAME

(71) Applicant: LG ENERGY SOLUTION, LTD., Seoul (KR)

(72) Inventors: Chang Ju Lee, Daejeon (KR); Sang Wook Woo, Daejeon (KR); Suk In Noh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 456 days.

(21) Appl. No.: 18/020,894

(22) PCT Filed: Sep. 15, 2021

(86) PCT No.: PCT/KR2021/012632
§ 371 (c)(1),
(2) Date: Feb. 10, 2023

(87) PCT Pub. No.: WO2022/060106
PCT Pub. Date: Mar. 24, 2022

(65) Prior Publication Data
US 2023/0307640 A1 Sep. 28, 2023

(30) Foreign Application Priority Data
Sep. 18, 2020 (KR) .......................... 10-2020-0120879

(51) Int. Cl.
| | | |
|---|---|---|
| *H01M 4/02* | (2006.01) | |
| *C01B 32/20* | (2017.01) | |
| *H01M 4/133* | (2010.01) | |
| *H01M 4/587* | (2010.01) | |
| *H01M 4/62* | (2006.01) | |
| *H01M 10/02* | (2006.01) | |
| *H01M 10/052* | (2010.01) | |

(52) U.S. Cl.
CPC ............ *H01M 4/587* (2013.01); *C01B 32/20* (2017.08); *H01M 4/133* (2013.01); *H01M 10/052* (2013.01); *C01P 2002/02* (2013.01); *C01P 2002/60* (2013.01); *C01P 2002/74* (2013.01); *C01P 2002/78* (2013.01); *C01P 2004/50* (2013.01); *C01P 2004/61* (2013.01); *C01P 2004/84* (2013.01); *C01P 2006/11* (2013.01); *C01P 2006/12* (2013.01); *C01P 2006/40* (2013.01); *C01P 2006/80* (2013.01); *H01M 2004/021* (2013.01); *H01M 2004/027* (2013.01)

(58) Field of Classification Search
CPC ........ H01M 4/02; H01M 4/049; H01M 4/133; H01M 4/1393; H01M 4/583; H01M 4/62; H01M 4/621; H01M 4/622; H01M 4/623; H01M 4/624; H01M 4/625; H01M 4/626; H01M 4/8663; H01M 4/8668; H01M 4/362; H01M 4/364; H01M 4/366; H01M 2004/027
See application file for complete search history.

(56) References Cited

U.S. PATENT DOCUMENTS

| | | |
|---|---|---|
| 5,705,139 A | 1/1998 | Stiller et al. |
| 2004/0115117 A1 | 6/2004 | Takei et al. |
| 2009/0242849 A1 | 10/2009 | Sudoh et al. |
| 2010/0009193 A1 | 1/2010 | Takeda et al. |
| 2010/0221543 A1 | 9/2010 | Sudoh et al. |
| 2011/0045354 A1 | 2/2011 | Takei et al. |
| 2013/0323601 A1 | 12/2013 | Nishimura et al. |
| 2014/0205532 A1 | 7/2014 | Takeuchi et al. |
| 2015/0349332 A1 | 12/2015 | Azami et al. |
| 2017/0352871 A1 | 12/2017 | Kim et al. |
| 2020/0295351 A1 | 9/2020 | Piao et al. |

FOREIGN PATENT DOCUMENTS

| | | | |
|---|---|---|---|
| CN | 101321695 | A | 12/2008 |
| CN | 102844919 | A | 12/2012 |
| JP | 5-28998 | A | 2/1993 |
| JP | 10-326611 | A | 12/1998 |
| JP | H10326611 | A * | 12/1998 |
| JP | 2004-247245 | A | 9/2004 |
| JP | 4403327 | B2 | 1/2010 |
| JP | 2010-267629 | A | 11/2010 |
| JP | 2013-211279 | A | 10/2013 |
| JP | 2017-63040 | A | 3/2017 |
| JP | 6136680 | B2 | 5/2017 |
| JP | 2018-147878 | A | 9/2018 |

(Continued)

OTHER PUBLICATIONS

Machine translation: JP-H10326611-A, Suzuki Kimihito, (Year: 2025).*

(Continued)

*Primary Examiner* — Kendra Ly

(74) *Attorney, Agent, or Firm* — Birch, Stewart, Kolasch & Birch, LLP

(57) ABSTRACT

A negative electrode active material including artificial graphite particle, wherein a thermal expansion coefficient measured by a specific method is in a range of $108 \times 10^{-6}$/K to $150 \times 10^{-6}$/K. The negative electrode active material has excellent adhesion to an electrode, and has excellent processability and long-term cycle life characteristics accordingly, and the negative electrode including the negative electrode active material has high capacity and excellent initial efficiency.

14 Claims, No Drawings

(56) References Cited

FOREIGN PATENT DOCUMENTS

| | | |
|---|---|---|
| JP | 2020-27745 A | 2/2020 |
| KR | 10-2004-0012713 A | 2/2004 |
| KR | 10-2009-0094098 A | 9/2009 |
| KR | 10-2013-0085450 A | 7/2013 |
| KR | 10-1348226 B1 | 1/2014 |
| KR | 10-1380730 B1 | 4/2014 |
| KR | 10-2017-0136878 A | 12/2017 |
| KR | 10-2019-0062319 A | 6/2019 |
| KR | 10-2019-0143620 A | 12/2019 |
| KR | 10-2020-0064052 A | 6/2020 |

OTHER PUBLICATIONS

Extended European Search Report for European Application No. 21869728.2, dated Sep. 18, 2024.
International Search Report for PCT/KR2021/012632 (PCT/ISA/210) mailed on Dec. 23, 2021.

\* cited by examiner

NEGATIVE ELECTRODE ACTIVE MATERIAL, AND NEGATIVE ELECTRODE AND SECONDARY BATTERY WHICH INCLUDE THE SAME

TECHNICAL FIELD

Cross-Reference to Related Applications

This application claims priority from Korean Patent Application No. 10-2020-0120879, filed on Sep. 18, 2020, the disclosure of which is incorporated by reference herein.

TECHNICAL FIELD

The present invention relates to a negative electrode active material, and a negative electrode and a secondary battery which include the same.

BACKGROUND ART

An eco-friendly alternative energy source is becoming an indispensable factor for future life as the price of energy sources increases due to the depletion of fossil fuels and interest in environmental pollution grows.

Particularly, demand for secondary batteries as the eco-friendly alternative energy source has been significantly increased as technology development and demand with respect to mobile devices have increased.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted. Lithium secondary batteries having high energy density, high discharge voltage, and high output stability have been mainly researched and used as power sources of these electric vehicles (EVs) and hybrid electric vehicles (HEVs).

In the secondary battery, lithium metal has been conventionally used as a negative electrode, but the use of a carbon-based active material, which may reversibly intercalate and deintercalate lithium ions and maintains structural and electrical properties, has emerged as a battery short circuit due to formation of dendrites and risk of accompanying explosion become a problem.

Various types of carbon-based materials, such as artificial graphite, natural graphite, and hard carbon, have been used as the carbon-based active material, and, among them, a graphite-based active material, which may guarantee life characteristics of the lithium secondary battery due to excellent reversibility, has been most widely used. Since the graphite-based active material has a low discharge voltage relative to lithium of −0.2 V, a battery using the graphite-based active material may exhibit a high discharge voltage of 3.6 V, and thus, it provides many advantages in terms of energy density of the lithium battery.

Among the graphite-based active materials, artificial graphite is advantageous in that it has a better swelling inhibition effect than natural graphite and has excellent high-temperature characteristics. However, since the artificial graphite has a problem in that output characteristics are low because it has fewer pores than the natural graphite, it is known that the artificial graphite is used in the form of a secondary particle in which primary particles are aggregated or bonded, in order to improve the output characteristics and form pores in the particle.

However, the artificial graphite assembled into the secondary particle is highly likely to have an irregular and non-smooth shape depending on a shape of the primary particles and their assembly. The artificial graphite has a problem of poor electrode adhesion when it is used in a negative electrode, has low processability due to the reduction in electrode adhesion, and has a problem of degradation of long-term cycle characteristics due to occurrence of an active material exfoliation phenomenon during operation of the negative electrode.

Japanese Patent No. 4403327 discloses graphite powder for a negative electrode of a lithium ion secondary battery, but does not provide an alternative to the above-described problems.

PRIOR ART DOCUMENT

Patent Document

Japanese Patent No. 4403327

DISCLOSURE OF THE INVENTION

Technical Problem

An aspect of the present invention provides a negative electrode active material having high capacity and initial efficiency as well as excellent adhesion in the negative electrode active material including artificial graphite in the form of a secondary particle.

Another aspect of the present invention provides a negative electrode including the above-described negative electrode active material.

Another aspect of the present invention provides a secondary battery including the above-described negative electrode.

Technical Solution

According to an aspect of the present invention, there is provided a negative electrode active material including artificial graphite particle in the form of a secondary particle in which a plurality of primary artificial graphite particles are bonded, wherein a thermal expansion coefficient of the negative electrode active material measured by a method including the following steps is in a range of $108 \times 10^{-6}$/K to $150 \times 10^{-6}$/K.

(a) mixing the negative electrode active material and a pitch binder in a weight ratio of 90:10, and preparing a mixture pellet having a density of 1.5 g/cc to 2.0 g/cc; (b) performing thermomechanical analysis on the mixture pellet to obtain a thermal expansion coefficient of the mixture pellet; (c) preparing a pitch binder pellet having a density of 1.5 g/cc to 2.0 g/cc from the pitch binder, and performing thermomechanical analysis to obtain the thermal expansion coefficient of the pitch binder pellet; and (d) obtaining a thermal expansion coefficient of the negative electrode active material through Equation 1 below:

$$A = \{C - (B \times 0.1)\}/0.9 \qquad \text{[Equation 1]}$$

In Equation 1, A is the thermal expansion coefficient of the negative electrode active material, B is the thermal expansion coefficient of the pitch binder pellet, and C is the thermal expansion coefficient of the mixture pellet.

According to another aspect of the present invention, there is provided a negative electrode including a negative electrode current collector; and a negative electrode active material layer on the negative electrode current collector, wherein the negative electrode active material layer includes the above-described negative electrode active material.

According to another aspect of the present invention, there is provided a secondary battery including the above-described negative electrode; a positive electrode facing the negative electrode; a separator between the negative electrode and the positive electrode; and an electrolyte.

Advantageous Effects

A negative electrode active material of the present invention is characterized in that it includes artificial graphite particles in the form of a secondary particle, wherein a thermal expansion coefficient measured by the above method satisfies a specific range. The negative electrode active material satisfying the above thermal expansion coefficient range has excellent adhesion in a negative electrode and simultaneously, may improve capacity and initial efficiency.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve of particles. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

Negative Electrode Active Material

The present invention relates to a negative electrode active material, and particularly, to a negative electrode active material for a lithium secondary battery.

Specifically, the negative electrode active material according to the present invention includes artificial graphite in the form of a secondary particle in which a plurality of primary artificial graphite particles are bonded, wherein a thermal expansion coefficient measured by a method including the following steps is in a range of $108 \times 10^{-6}$/K to $150 \times 10^{-6}$/K.

(a) mixing the negative electrode active material and a pitch binder in a weight ratio of 90:10, and preparing a mixture pellet having a density of 1.5 g/cc to 2.0 g/cc;
(b) performing thermomechanical analysis on the mixture pellet to obtain a thermal expansion coefficient of the mixture pellet;
(c) preparing a pitch binder pellet having a density of 1.5 g/cc to 2.0 g/cc from the pitch binder, and performing thermomechanical analysis to obtain the thermal expansion coefficient of the pitch binder pellet; and
(d) obtaining a thermal expansion coefficient of the negative electrode active material through Equation 1 below.

$$A=\{C-(B\times 0.1)\}/0.9 \qquad \text{[Equation 1]}$$

(in Equation 1, A is the thermal expansion coefficient of the negative electrode active material, B is the thermal expansion coefficient of the pitch binder pellet, and C is the thermal expansion coefficient of the mixture pellet)

Conventionally, it is known that artificial graphite has a lower degree of occurrence of swelling than natural graphite and has excellent storage characteristics, but has inferior output characteristics. A method of preparing artificial graphite in the form of a secondary particle by aggregating or bonding a plurality of primary particles and providing a void between the primary particles is being studied in order to improve the output characteristics of the artificial graphite, but the artificial graphite assembled in the form of a secondary particle has a problem that electrode adhesion is significantly reduced due to its irregular and complicated shape, and accordingly, there is a problem in that processability is reduced and an active material exfoliation phenomenon occurs during operation of a negative electrode to degrade long-term life characteristics.

In order to solve these problems, the negative electrode active material of the present invention is characterized in that the thermal expansion coefficient measured by the above method is adjusted to a specific range. The negative electrode active material satisfying the above thermal expansion coefficient range is evaluated as having a random structure of the primary particle in the active material, and, since the secondary particle formed by bonding these random primary particles has a smooth surface as a whole and irregularity of a shape is alleviated, the electrode adhesion may be improved, and, accordingly, the negative electrode active material may have high processability and life characteristics. Also, the negative electrode active material satisfying the above thermal expansion coefficient range may have improved electrode adhesion and simultaneously, may have excellent capacity and initial efficiency.

The negative electrode active material includes artificial graphite particle.

The artificial graphite particle may be an artificial graphite particle in the form of a secondary particle in which a plurality of primary artificial graphite particles are bonded. Specifically, the artificial graphite particle may be a bonded body of the plurality of primary artificial graphite particles. In a case in which the artificial graphite particle is the artificial graphite particle in the form of a secondary particle, since voids are formed between the primary artificial graphite particles, the output characteristics of the artificial graphite particles may be further improved by securing these voids.

With respect to the artificial graphite particle in the form of a secondary particle, the secondary particle may be the bonded body of the plurality of primary artificial graphite particles, and, specifically, in the artificial graphite particle in the form of a secondary particle, the primary artificial graphite particles are not bonded to each other by van der Waals force, but the plurality of primary artificial graphite particles may be bonded or aggregated with a resin binder, such as pitch, to form the secondary particle.

The primary artificial graphite particles may be formed after powdering a carbon precursor. The carbon precursor may be at least one selected from the group consisting of coal-based heavy oil, fiber-based heavy oil, tars, pitches, and cokes. Since the primary artificial graphite particles formed of the powdered carbon precursor may have improved cohesiveness, primary artificial graphite particles having high hardness may be formed.

The artificial graphite particles in the form of secondary particles may be formed by adding the carbon precursor in the form of powder to a reactor, operating the reactor to bond the powder by a centrifugal force to form secondary particles in which primary particles are bonded, and performing graphitization at a temperature of 2,500° C. to 3,500° C., for example, at a temperature of 2,700° C. to 3,200° C. In the graphitization process, graphitization of the primary particles and the secondary particles may be performed at the same time. In a process of bonding the powder, a resin binder, such as pitch, may be added to the reactor together, and a heat treatment may be performed at a temperature of about 400° C. to 800° C.

An average particle diameter ($D_{50}$) of the primary artificial graphite particles may be in a range of 5 μm to 15 μm, preferably 8 μm to 12 μm, and more preferably 8.5 μm to 9.5 μm. When the primary artificial graphite particles have an average particle diameter ($D_{50}$) in the above range, since a problem of increasing a specific surface area and decreasing adhesion due to an excessively large particle diameter may be prevented and a problem of increasing orientation due to the excessively large particle diameter and a problem of decreasing the output characteristics may be prevented, the electrode adhesion, output characteristics and capacity characteristics of the negative electrode active material may be easily achieved.

The negative electrode active material may include sulfur (S) distributed in the primary artificial graphite particles.

In general, the sulfur is treated as an impurity, and may be removed in graphitization and deironization processes during preparation of artificial graphite, and, for example, a process of removing the impurity is performed by heat treating at a high temperature of 1,000° C. to 1,500° C. before grinding a raw material (cokes, etc.) during the preparation of the artificial graphite. However, in a case in which the sulfur is included in the raw material in an appropriate amount, it may play a role in randomizing a crystal structure of the primary artificial graphite particles prepared by performing a process, such as grinding, on the raw material, and, accordingly, randomness of the shape of the ground primary artificial graphite particles may be improved. Thus, if the primary artificial graphite particles including the sulfur in an appropriate amount are bonded to each other to form a secondary particle, artificial graphite particles in the form of the secondary particle having a smooth surface may be prepared, a negative electrode active material having the above-described thermal expansion coefficient may be achieved, and the electrode adhesion may be improved.

The sulfur may be included in an amount of 15 ppm to 40 ppm, preferably 18 ppm to 35 ppm, and more preferably 23 ppm to 25 ppm in the negative electrode active material, and, when the amount of the sulfur is within the above range, it is desirable because the thermal expansion coefficient of the negative electrode active material of the present invention is easily achieved, a reduction in initial efficiency, a decrease in capacity, and an increase in electrolyte solution side reaction due to an excessive amount of the sulfur are prevented while the electrode adhesion and life characteristics are improved.

The amount of the sulfur according to the present invention may be achieved by a method in which heat treatment conditions of the graphitization and deironization processes are controlled during the preparation of the artificial graphite particles, a calcination process generally performed during preparation of artificial graphite is not performed, calcination conditions are controlled, or the artificial graphite raw material is properly selected. Specifically, the amount of the sulfur according to the present invention may be achieved by not performing the calcination process performed before the grinding of the artificial graphite raw material (coke, etc.), or by performing the calcination process at a low temperature of 500° C. or less, preferably, 300° C. or less, in a preparation process of the artificial graphite particles.

The amount of the sulfur may be measured by an inductively coupled plasma (ICP) analysis method.

The negative electrode active material may further include a carbon coating layer on a surface of the artificial graphite particle. The carbon coating layer may contribute to improve structural stability of the artificial graphite particle and prevent a side reaction between the negative electrode active material and the electrolyte solution.

The carbon coating layer may be present in an amount of 0.1 wt % to 5 wt %, for example, 1 wt % to 4 wt % in the negative electrode active material. The presence of the carbon coating layer may improve the structural stability of the negative electrode active material, but, since there is a concern that excessive formation of the carbon coating layer causes degradation of high-temperature storage performance and the reduction in the initial efficiency due to an increase in the specific surface area during rolling of the negative electrode, it is desirable to form the carbon coating layer within the above-described amount range.

The carbon coating layer may include amorphous carbon. For example, after at least one carbon coating layer precursor selected from the group consisting of coal-based heavy oil, fiber-based heavy oil, tars, pitches, and cokes is provided to the artificial graphite particles, the carbon coating layer may be formed by heat treating the carbon coating layer precursor. A heat treatment process for forming the carbon coating layer may be performed at 1,000° C. to 1,500° C. in terms of promoting uniform formation of the carbon coating layer.

The negative electrode active material may have an average particle diameter ($D_{50}$) of 10 μm to 30 μm, preferably 14 μm to 25 μm, and more preferably 15 μm to 20 μm, for example, 16 μm to 17 μm. Particularly, in a case in which the negative electrode active material includes artificial graphite particles in the form of secondary particles and has an average particle diameter within the above range, it may be evaluated that the secondary particles are smoothly assembled, the electrode adhesion may be further improved, and processability in preparation of the negative electrode may be improved.

The negative electrode active material may have a Brunauer-Emmett-Teller (BET) specific surface area of 0.3 $m^2/g$ to 2.5 $m^2/g$, for example, 0.5 $m^2/g$ to 1 $m^2/g$, and, when the BET specific surface area is within the above range, it is desirable in terms of being able to further improve the initial efficiency by preventing the side reaction with the electrolyte solution.

A spacing d002 of a crystal plane, which is measured by X-ray diffraction (XRD) analysis of the artificial graphite particle in the form of a secondary particle, may be in a range of 0.3357 nm to 0.3361 nm, for example, 0.33575 nm to 0.33585 nm, and, when the spacing d002 is within the above range, it is desirable because the above-described thermal expansion coefficient range may be easily achieved to improve the electrode adhesion and crystallization of the graphite layer and its laminated structure may be well achieved to secure the capacity of the negative electrode active material and improve the initial efficiency and energy density.

A crystallite size Lc in a c-axis direction of the artificial graphite particle in the form of a secondary particle may be in a range of 45 nm to 75 nm, for example, 60 nm to 70 nm. When the crystallite size Lc is within the above range, it is desirable because the above-described thermal expansion coefficient range may be easily achieved to improve the electrode adhesion and the crystallization of the graphite layer and its laminated structure may be well achieved to secure the capacity of the negative electrode active material and improve the initial efficiency and energy density.

The negative electrode active material may have a tap density of 0.88 g/cc to 1.20 g/cc, preferably 0.92 g/cc to 1.15 g/cc, and more preferably 1.04 g/cc to 1.10 g/cc, and, in a case in which the tap density range as well as the thermal expansion coefficient range is satisfied, it is desirable because a negative electrode active material having a smooth and uniform surface may be achieved to realize high electrode adhesion.

A thermal expansion coefficient, which is measured by a method including the following steps (step (a) to step (d)), of the negative electrode active material is in a range of $10^8 \times 10^{-6}/K$ to $150 \times 10^{-6}/K$.
  (a) mixing the negative electrode active material and a pitch binder in a weight ratio of 90:10, and preparing a mixture pellet having a density of 1.5 g/cc to 2.0 g/cc;
  (b) performing thermomechanical analysis on the mixture pellet to obtain a thermal expansion coefficient of the mixture pellet;
  (c) preparing a pitch binder pellet having a density of 1.5 g/cc to 2.0 g/cc from the pitch binder, and performing thermomechanical analysis to obtain a thermal expansion coefficient of the pitch binder pellet; and
  (d) obtaining a thermal expansion coefficient of the negative electrode active material through Equation 1 below:

$$A = \{C - (B \times 0.1)\}/0.9 \qquad \text{[Equation 1]}$$

(in Equation 1, A is the thermal expansion coefficient of the negative electrode active material, B is the thermal expansion coefficient of the pitch binder pellet, and C is the thermal expansion coefficient of the mixture pellet).

With respect to step (a) in the method of measuring the thermal expansion coefficient, it is a step of preparing a mixture pellet by mixing the negative electrode active material and the pitch binder having viscosity, because the negative electrode active material of the present invention does not have viscosity and a volatile matter in the artificial graphite particles included in the negative electrode active material so that it is difficult to prepare in the form of a pellet. As will be described later, after measuring the thermal expansion coefficient of the mixture pellet, the thermal expansion coefficient of the negative electrode active material may be evaluated according to Equation 1.

The mixture pellet may be prepared to have a density of 1.5 g/cc to 2.0 g/cc, for example, 1.8 g/cc, to ensure objectivity of the evaluation.

The mixture pellet may have a diameter of 10 mm to 15 mm, for example, 13 mm.

With respect to step (b) in the method of measuring the thermal expansion coefficient, it is a step of measuring a thermal expansion coefficient of the mixture pellet through thermomechanical analysis. The thermomechanical analysis and the measurement of the thermal expansion coefficient may use a thermomechanical analyzer (TMA), and specifically, may be one in which a heating rate is set to 10° C./min and the thermal expansion coefficient is measured in a temperature range of 30° C. to 100° C.

With respect to step (c) in the method of measuring the thermal expansion coefficient, it is a step of measuring a thermal expansion coefficient of the pitch binder itself by preparing the pitch binder pellet. The pitch binder pellet may be prepared to have the same shape, density, and diameter as the mixture pellet.

The pitch binder pellet may be prepared to have a density of 1.5 g/cc to 2.0 g/cc, for example, 1.8 g/cc, to ensure objectivity of the evaluation, and may specifically be prepared to have the same density, shape, and diameter as the mixture pellet prepared in step (a).

The pitch binder pellet may be prepared to have a diameter of 10 mm to 15 mm, for example, 13 mm.

With respect to step (d) in the method of measuring the thermal expansion coefficient, it is a step of obtaining a thermal expansion coefficient of the negative electrode active material itself by considering a mixing weight ratio (90:10) of the negative electrode active material to the pitch binder in step (a). Specifically, in the mixture pellet, the negative electrode active material and the pitch binder have their respective thermal expansion coefficients and contribute to the thermal expansion coefficient of the mixture pellet according to their weight ratio, and, when considering this, a relationship between the thermal expansion coefficient (C) of the mixture pellet, the thermal expansion coefficient (B) of the pitch binder pellet, and the thermal expansion coefficient (A) of the negative electrode active material may be expressed by Equation 2 below.

$$C = \{(A \times 90) + (B \times 10)\}/100 \qquad \text{[Equation 2]}$$

If Equation 2 is converted into an equation relating to the thermal expansion coefficient (A) of the negative electrode active material, Equation 1 may be obtained, and through this, the thermal expansion coefficient of the negative electrode active material itself may be predicted and evaluated.

In a case in which the negative electrode active material has a thermal expansion coefficient within the above range, high electrode adhesion and the resulting improvement in processability and life characteristics may not only be obtained, but a negative electrode active material having high capacity and initial efficiency may also be achieved.

If, in a case in which the thermal expansion coefficient of the negative electrode active material is less than $10^8 \times 10^{-6}/K$, since it is difficult to see that the primary artificial graphite particles have a random structure and the surface of the artificial graphite particles in the form of a secondary particle, as an assembly of the primary artificial graphite particles, is not smooth, it is difficult to improve the electrode adhesion, the processability is reduced, and there is a high possibility that exfoliation of the negative electrode active material occurs during the operation of the negative electrode, and thus, long-term cycle life characteristics may be degraded. If, in a case in which the thermal expansion coefficient of the negative electrode active material is greater than $150\times10^{-6}$/K, it is not desirable because a degree of graphitization is low due to an excessively random structure of the primary artificial graphite particles, the capacity is excessively reduced, and the initial efficiency may be reduced.

The thermal expansion coefficient of the negative electrode active material may be preferably in a range of $110\times10^{-6}$/K to $140\times10^{-6}$/K, for example, $112\times10^{-6}$/K to $120\times10$-6/K, and, when the thermal expansion coefficient of the negative electrode active material is within the above range, an effect of simultaneously improving the electrode adhesion, life characteristics, capacity, and initial efficiency may be preferably achieved.

The thermal expansion coefficient of the negative electrode active material may be achieved by appropriately adjusting randomness of the primary artificial graphite particles and a shape of the artificial graphite particles in the form of a secondary particle. Specifically, the thermal expansion coefficient of the negative electrode active material may be achieved by appropriately adjusting an amount of impurity, such as sulfur, in the primary artificial graphite particle, a size of the primary artificial graphite particle, a size of the secondary particle, or a degree of granulation, but the present invention is not limited thereto.

Negative Electrode

Also, the present invention provides a negative electrode including the above-described negative electrode active material, more particularly, a negative electrode for a lithium secondary battery.

The negative electrode includes a negative electrode current collector; and a negative electrode active material layer on the negative electrode current collector. The negative electrode active material layer includes the above-described negative electrode active material.

A negative current collector generally used in the art may be used without limitation as the negative electrode current collector, and, for example, the negative electrode current collector is not particularly limited so long as it has high conductivity without causing adverse chemical changes in the lithium secondary battery. For example, the negative electrode current collector may include at least one selected from copper, stainless steel, aluminum, nickel, titanium, fired carbon, and an aluminum-cadmium alloy, preferably, copper.

The negative electrode current collector may have fine surface roughness to improve bonding strength with the negative electrode active material, and the negative electrode current collector may be used in various shapes such as a film, a sheet, a foil, a net, a porous body, a foam body, a non-woven fabric body, and the like.

The negative electrode current collector generally may have a thickness of 3 μm to 500 μm.

The negative electrode active material layer is stacked on the negative electrode current collector and includes the above-described negative electrode active material.

The negative electrode active material may be included in an amount of 80 wt % to 99 wt %, for example, 93 wt % to 98 wt % in the negative electrode active material layer.

The negative electrode active material layer may further include a binder, a conductive agent, and/or a thickener in addition to the above-described negative electrode active material.

The binder is a component that assists in the binding between the active material and/or the current collector, wherein the binder may commonly be included in an amount of 1 wt % to 30 wt %, for example, 1 wt % to 10 wt % in the negative electrode active material layer.

The binder may include at least one selected from the group consisting of polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, and a fluorine rubber, preferably, at least one selected from polyvinylidene fluoride and a styrene-butadiene rubber.

Any thickener used in a conventional lithium secondary battery may be used as the thickener, and an example thereof is carboxymethyl cellulose (CMC).

The conductive agent is a component for further improving the conductivity of the negative electrode active material, wherein the conductive agent may be included in an amount of 1 wt % to 30 wt %, for example, 1 wt % to 10 wt % in the negative electrode active material layer.

Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

A negative electrode slurry is prepared by mixing the above-described negative electrode active material and at least one selected from the binder, the conductive agent, and the thickener in a solvent, and the negative electrode active material layer may be prepared by coating the negative electrode current collector with the negative electrode slurry, and rolling and drying the coated negative electrode current collector.

The solvent may include water or an organic solvent, such as N-methyl-2-pyrrolidone (NMP), and may be used in an amount such that desirable viscosity is obtained when the negative electrode active material as well as optionally the binder and the conductive agent are included. For example, the solvent may be included in an amount such that a concentration of a solid content including the negative electrode active material as well as optionally at least one selected from the binder, the thickener, and the conductive agent is in a range of 50 wt % to 95 wt %, for example, 70 wt % to 90 wt %.

An area ratio I(004)/I(110) (orientation index) during X-ray diffraction analysis of the negative electrode may be in a range of 7 to 14, for example, 7.5 to 9.5. When the area ratio I(004)/I(110) is within the above-described range, since the active material particles may be arranged to minimize a diffusion path of lithium ions, lithium ion diffusion resistance may be reduced. The orientation index may be achieved by using the above-described negative electrode active material in the negative electrode.

Secondary Battery

Furthermore, the present invention provides a secondary battery including the above-described negative electrode, more particularly, a lithium secondary battery.

The secondary battery may include the above-described negative electrode; a positive electrode facing the negative electrode, a separator between the negative electrode and the positive electrode, and an electrolyte.

The positive electrode may include a positive electrode current collector; and a positive electrode active material layer on the positive electrode current collector.

A positive current collector generally used in the art may be used without limitation as the positive electrode current collector, and, for example, the positive electrode current collector is not particularly limited so long as it has high conductivity without causing adverse chemical changes in the secondary battery. For example, the positive electrode current collector may include at least one selected from copper, stainless steel, aluminum, nickel, titanium, fired carbon, and an aluminum-cadmium alloy, preferably, aluminum.

The positive electrode current collector may have fine surface roughness to improve bonding strength with the positive electrode active material, and the positive electrode current collector may be used in various shapes such as a film, a sheet, a foil, a net, a porous body, a foam body, a non-woven fabric body, and the like.

The positive electrode current collector generally may have a thickness of 3 µm to 500 µm.

The positive electrode active material layer may include a positive electrode active material.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $O<S2<1$, and $p2+q2+r3+S2=1$), etc.), and any one thereof or a mixture of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.2}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.2}Co_{0.2})O_2$, and any one thereof or a mixture of two or more thereof may be used.

The positive electrode active material may be included in an amount of 80 wt % to 99 wt % in the positive electrode active material layer.

The positive electrode active material layer may further include at least one selected from a binder and a conductive agent together with the positive electrode active material.

The binder is a component that assists in the binding between the active material and the conductive agent and in the binding with the current collector, wherein the binder is commonly added in an amount of 1 wt % to 30 wt % based on a total weight of a positive electrode material mixture. Examples of the binder may be at least one selected from the group consisting of polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluorine rubber.

The binder may be included in an amount of 1 wt % to 30 wt % in the positive electrode active material layer.

Any conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The conductive agent may be added in an amount of 1 wt % to 30 wt % in the positive electrode active material layer.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and, for example, a mixture of a cyclic carbonate (e.g., ethylene carbonate or propylene carbonate) having high ionic conductivity and high dielectric constant and a low-viscosity linear carbonate-based compound (e.g., ethylmethyl carbonate, dimethyl carbonate, or diethyl carbonate) may more preferably be used, said mixture may increase charge/discharge performance of the battery. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

As described above, since the lithium secondary battery according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs) and particularly, may be preferably used as a constituent battery of a medium and large sized battery module. Thus, the present invention also provides a medium and large sized battery module including the above-described secondary battery as a unit cell.

The medium and large sized battery module may be preferably used in power sources that require high output and large capacity, such as an electric vehicle, a hybrid electric vehicle, and a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

1. Preparation of Negative Electrode Active Material

Example 1: Preparation of Negative Electrode Active Material

<Preparation of Negative Electrode Active Material>

Powder having an average particle diameter ($D_{50}$) of 10 μm was obtained by grinding petroleum-based coke with a sulfur content of 2,916 ppm using an impact mill. A separate calcination process was not performed during the grinding of the coke. Secondary particles, in which a plurality of primary particles were bonded, were prepared by heat treating the powder at 550° C. in an inert gas ($N_2$) atmosphere using a vertical granulator.

Next, the secondary particles were graphitized by performing a heat treatment at 3,000° C. for 20 hours or more in an inert gas atmosphere to prepare artificial graphite particles in the form of a secondary particle.

The artificial graphite particles in the form of a secondary particle and petroleum-based pitch were mixed and heat-treated at 1,300° C. in a roller hearth kiln to form an amorphous carbon coating layer on the secondary particles.

A negative electrode active material thus prepared had a sulfur content of 29.4 ppm, an average particle diameter ($D_{50}$) of the primary artificial graphite particles was 11 μm, an average particle diameter ($D_{50}$) of the negative electrode active material was 19.4 μm, d002 measured by XRD was 0.3360 nm, a crystallite size Lc in a c-axis direction was 63.9 nm, a BET specific surface area was 0.7 m²/g, tap density was 0.95 g/cc, and an amount of the amorphous carbon coating layer in the negative electrode active material was 3 wt %.

In this case, the tap density was obtained by measuring apparent density by measuring a final volume which was obtained by vibrating up and down 1,000 times after charging 40 g of the negative electrode active material in a container.

The BET specific surface area of the negative electrode active material was measured by a BET (Brunauer-Emmett-Teller) measurement method using BELSORP (BET instrument) by BEL JAPAN, INC. in which the negative electrode active material was pretreated at 130° C. and nitrogen gas was used.

<Measurement of Thermal Expansion Coefficient>

The negative electrode active material prepared above and a pitch binder were mixed in a weight ratio of 90:10, and a mixture pellet having a density of 1.8 g/cc and a diameter of 13 mm was prepared.

1 g of the mixture pellet was put in a TMA instrument (manufacturer: Mettler Toledo, instrument name: SDTA840), a heating rate was set to 10° C./min, and a thermal expansion coefficient ($128 \times 10^{-6}$/K) of the mixture pellet in a temperature range of 30° C. to 100° C. was measured.

After preparing the same pitch binder as the pitch binder used above, a pitch binder pellet having a density of 1.8 g/cc, a diameter of 13 mm, and the same shape as the mixture pellet was prepared. 1 g of the pitch binder pellet was put in a TMA instrument, and a thermal expansion coefficient (56×10⁻⁶/K) of the pitch binder pellet was measured under the same conditions as thermal expansion coefficient measurement conditions of the mixture pellet.

Next, a thermal expansion coefficient (136×10⁻⁶/K) of the negative electrode active material was calculated by Equation 1 below.

$$A = \{C - (B \times 0.1)\}/0.9 \quad \text{[Equation 1]}$$

(A: the thermal expansion coefficient of the negative electrode active material, B: the thermal expansion coefficient of the pitch binder pellet, C: the thermal expansion coefficient of the mixture pellet)

Example 2: Preparation of Negative Electrode Active Material

<Preparation of Negative Electrode Active Material>

A negative electrode active material was prepared in the same manner as in Example 1 except that powder having an average particle diameter ($D_{50}$) of 10 μm was obtained by grinding petroleum-based coke with a sulfur content of 2,531 ppm using an impact mill and secondary particles were prepared from the powder using a horizontal granulator.

The negative electrode active material prepared above had a sulfur content of 22.4 ppm, an average particle diameter ($D_{50}$) of primary artificial graphite particles was 10 μm, an average particle diameter ($D_{50}$) of the negative electrode active material was 18.1 μm, d002 measured by XRD was 0.3359 nm, a crystallite size Lc in a c-axis direction was 66.7 nm, a BET specific surface area was 0.7 m²/g, tap density was 1.03 g/cc, and an amount of an amorphous carbon coating layer in the negative electrode active material was 3 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: 119×10⁻⁶/K
Thermal expansion coefficient of pitch binder: 56×10⁻⁶/K
Thermal expansion coefficient of the negative electrode active material: 126×10⁻⁶/K Example 3: Preparation of Negative Electrode Active Material <Preparation of Negative Electrode Active Material>

A negative electrode active material was prepared in the same manner as in Example 1 except that powder having an average particle diameter ($D_{50}$) of 10 μm was obtained by grinding petroleum-based coke with a sulfur content of 2,008 ppm using an impact mill, secondary particles were prepared from the powder using a horizontal granulator, and a mixing weight ratio of the artificial graphite particles in the form of a secondary particle to petroleum-based pitch was adjusted such that an amount of an amorphous carbon coating layer in the negative electrode active material was 2 wt %.

The negative electrode active material prepared above had a sulfur content of 23.6 ppm, an average particle diameter ($D_{50}$) of primary artificial graphite particles was 9 μm, an average particle diameter ($D_{50}$) of the negative electrode active material was 16.5 μm, d002 measured by XRD was 0.3358 nm, a crystallite size Lc in a c-axis direction was 73.1 nm, a BET specific surface area was 0.6 m²/g, tap density was 1.05 g/cc, and the amount of the amorphous carbon coating layer in the negative electrode active material was 2 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: 110×10⁻⁶/K
Thermal expansion coefficient of pitch binder: 56×10⁻⁶/K
Thermal expansion coefficient of the negative electrode active material: 116×10⁻⁶/K Example 4: Preparation of Negative Electrode Active Material <Preparation of Negative Electrode Active Material>

A negative electrode active material was prepared in the same manner as in Example 1 except that a horizontal granulator, instead of a vertical granulator, was used when powder was used to prepare secondary particles in which a plurality of primary particles are bonded.

The negative electrode active material prepared above had a sulfur content of 26.7 ppm, an average particle diameter ($D_{50}$) of the primary artificial graphite particles was 11 μm, an average particle diameter ($D_{50}$) of the negative electrode active material was 22.4 μm, d002 measured by XRD was 0.3360 nm, a crystallite size Lc in a c-axis direction was 64.1 nm, a BET specific surface area was 0.7 m²/g, tap density was 0.89 g/cc, and an amount of an amorphous carbon coating layer in the negative electrode active material was 3 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: 123×10⁻⁶/K
Thermal expansion coefficient of pitch binder: 56×10⁻⁶/K
Thermal expansion coefficient of the negative electrode active material: about 130×10⁻⁶/K Comparative Example 1: Preparation of Negative Electrode Active Material <Preparation of Negative Electrode Active Material>

Powder having an average particle diameter ($D_{50}$) of 10 μm was obtained by heat treating petroleum-based needle coke with a sulfur content of 1,671 ppm up to 1,000° C. at a heating rate of 25° C./min and grinding the petroleum-based needle coke using an impact mill. The powder and petroleum-based pitch were mixed in a weight ratio of 87:13, and secondary particles, in which a plurality of primary particles were agglomerated, were prepared by performing a heat treatment at 550° C. for 10 hours in an inert gas ($N_2$) atmosphere using a vertical granulator (average particle diameter ($D_{50}$): 22.8 μm).

Next, the secondary particles were graphitized by performing a heat treatment at 3,000° C. for 20 hours or more in an inert gas atmosphere to prepare artificial graphite particles in the form of a secondary particle.

The artificial graphite particles in the form of a secondary particle and petroleum-based pitch were mixed and heat-treated at 1,300° C. in a roller hearth kiln to form an amorphous carbon coating layer on the secondary particles.

A negative electrode active material thus prepared had a sulfur content of less than 10 ppm, an average particle diameter ($D_{50}$) of the primary artificial graphite particles was 10 µm, an average particle diameter ($D_{50}$) of the negative electrode active material was 21.8 µm, d002 measured by XRD was 0.3361 nm, a crystallite size Lc in a c-axis direction was 67.7 nm, a BET specific surface area was 0.7 m²/g, tap density was 0.86 g/cc, and an amount of the amorphous carbon coating layer in the negative electrode active material was 3 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: $97 \times 10^{-6}$/K

Thermal expansion coefficient of pitch binder: $56 \times 10^{-6}$/K

Thermal expansion coefficient of the negative electrode active material: about $102 \times 10^{-6}$/K Comparative Example 2: Preparation of Negative Electrode Active Material <Preparation of Negative Electrode Active Material>

A negative electrode active material was prepared in the same manner as in Comparative Example 1 except that powder having an average particle diameter ($D_{50}$) of 9 µm was obtained by grinding petroleum-based needle coke with a sulfur content of 1,513 ppm using an impact mill, a separate calcination process was not performed during the grinding of the coke, the powder and petroleum-based pitch were mixed in a weight ratio of 90:10, and secondary particles were granulated using a vertical granulator.

The negative electrode active material prepared above had a sulfur content of 12.2 ppm, an average particle diameter ($D_{50}$) of primary artificial graphite particles was 9 µm, an average particle diameter ($D_{50}$) of the negative electrode active material was 13.4 µm, d002 measured by XRD was 0.3359 nm, a crystallite size Lc in a c-axis direction was 69.4 nm, a BET specific surface area was 0.9 m²/g, tap density was 1.00 g/cc, and an amount of an amorphous carbon coating layer in the negative electrode active material was 3 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixed pellet: $98 \times 10^{-6}$/K

Thermal expansion coefficient of pitch binder: $56 \times 10^{-6}$/K

Thermal expansion coefficient of the negative electrode active material: about $103 \times 10^{-6}$/K Comparative Example 3: Preparation of Negative Electrode Active Material <Preparation of Negative Electrode Active Material>

A negative electrode active material was prepared in the same manner as in Comparative Example 2 except that petroleum-based needle coke with a sulfur content of 1,236 ppm was used.

The negative electrode active material prepared above had a sulfur content of 10.8 ppm, an average particle diameter ($D_{50}$) of primary artificial graphite particles was 10 µm, an average particle diameter ($D_{50}$) of the negative electrode active material was 15.6 µm, d002 measured by XRD was 0.3357 nm, a crystallite size Lc in a c-axis direction was 75.7 nm, a BET specific surface area was 0.8 m²/g, tap density was 1.05 g/cc, and an amount of an amorphous carbon coating layer in the negative electrode active material was 3 wt %.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: $94 \times 10^{-6}$/K

Thermal expansion coefficient of pitch binder: $56 \times 10^{-6}$/K

Thermal expansion coefficient of the negative electrode active material: about $98 \times 10^{-6}$/K Comparative Example 4: Preparation of Negative Electrode Active Material <Preparation of Negative Electrode Active Material>

A negative electrode active material was prepared in the same manner as in Example 1 except that powder having an average particle diameter ($D_{50}$) of 10 µm was obtained by grinding petroleum-based coke with a sulfur content of 4,000 ppm or more using an impact mill and an amorphous carbon coating layer was not formed on artificial graphite in the form of a secondary particle.

The negative electrode active material prepared above had a sulfur content of 64.0 ppm, an average particle diameter ($D_{50}$) of primary artificial graphite particles was 10 µm, an average particle diameter ($D_{50}$) of the negative electrode active material was 15.2 µm, d002 measured by XRD was 0.3371 nm, a crystallite size Lc in a c-axis direction was 29 nm, a BET specific surface area was 0.9 m²/g, and tap density was 0.86 g/cc.

<Measurement of Thermal Expansion Coefficient>

A thermal expansion coefficient of the negative electrode active material was measured in the same manner as in Example 1 except that the negative electrode active material prepared above was used.

Thermal expansion coefficient of mixture pellet: $158 \times 10^{-6}$/K

Thermal expansion coefficient of pitch binder: $56 \times 10^{-6}$/K

Thermal expansion coefficient of the negative electrode active material: about $169 \times 10^{-6}$/K 2. Preparation of Negative Electrode The negative electrode active material prepared in Example 1, carbon black as a conductive agent, a styrene-butadiene rubber as a binder, and carboxymethyl cellulose, as a thickener, were mixed in a weight ratio of 95.3:1.0:1.2:2.5, and water was added to prepare a negative electrode slurry.

The negative electrode slurry was coated on a copper negative electrode current collector (thickness: 15 µm), vacuum dried at about 130° C. for 8 hours, and rolled to form a negative electrode active material layer (thickness: 84 µm) to prepare a negative electrode of Example 1. In this case, the negative electrode was prepared such that a loading of the negative electrode was 3.6 mAh/cm².

Negative electrodes of Examples 2 to 4 and Comparative Examples 1 to 4 were prepared in the same manner as in Example 1 except that the negative electrode active materials prepared in Examples 2 to 4 and Comparative Examples 1 to 4 were respectively used.

An orientation index of each of the negative electrodes of the examples and the comparative examples was obtained as an area ratio I(004)/I(110) which was obtained by measuring a (004) plane and a (110) plane by XRD and integrating each XRD peak measured.

<Initial Discharge Capacity and Initial Efficiency Evaluation>

Charge capacity and discharge capacity of the secondary batteries of the examples and the comparative examples prepared above were measured, initial efficiency was calculated by the following equation, and the results thereof are presented in Table 2. Charging and discharging conditions are as follows.

TABLE 1

| | Negative electrode active material | | | | | | | | |
|---|---|---|---|---|---|---|---|---|---|
| | Thermal expansion coefficient ($\times 10^{-6}$/K) | Sulfur content (ppm) | Average particle diameter ($D_{50}$) of primary particles (μm) | Average particle diameter ($D_{50}$) of negative electrode active material (μm) | d002 (nm) | Lc (nm) | Specific surface area (m$^2$/g) | Tap density (g/cc) | Negative electrode Orientation index (I(004)/I(110)) |
| Example 1 | 136 | 29.4 | 11 | 19.4 | 0.3360 | 63.9 | 0.7 | 0.95 | 10.0 |
| Example 2 | 126 | 22.4 | 10 | 18.1 | 0.3359 | 66.7 | 0.7 | 1.03 | 12.2 |
| Example 3 | 116 | 23.6 | 9 | 16.5 | 0.3358 | 73.1 | 0.6 | 1.05 | 8.4 |
| Example 4 | 130 | 26.7 | 11 | 22.4 | 0.3360 | 64.1 | 0.7 | 0.89 | 7.4 |
| Comparative Example 1 | 102 | <10 | 10 | 21.8 | 0.3361 | 67.7 | 0.7 | 0.86 | 12.5 |
| Comparative Example 2 | 103 | 12.2 | 9 | 13.4 | 0.3359 | 69.4 | 0.9 | 1.00 | 11.2 |
| Comparative Example 3 | 98 | 10.8 | 10 | 15.6 | 0.3357 | 75.7 | 0.8 | 1.05 | 12.6 |
| Comparative Example 4 | 169 | 64.0 | 10 | 15.2 | 0.3371 | 29.0 | 0.9 | 0.86 | 5.1 |

EXPERIMENTAL EXAMPLES

Experimental Example 1: Adhesion Evaluation

After the negative electrode of Example 1 was punched out to a size of 20 mm×150 mm and fixed to a center portion of a slide glass having a size of 25 mm×75 mm using a double-sided tape, 90 degree peel strength was measured while peeling off the negative electrode active material layer from the negative electrode current collector using a universal testing machine (UTM) (manufacturer: LLOYD Instrument LTD., machine name: LF Plus). The same five negative electrodes of Example 1 were prepared to measure 90 degree peel strength 5 times in the same manner, and an average value thereof was taken as adhesion (unit: gf/10 mm) of the negative electrode of Example 1.

90 degree peel strengths of Examples 2 to 4 and Comparative Examples 1 to 4 were measured in the same manner as in Example 1.

Experimental Example 2: Discharge Capacity and Initial Efficiency Evaluation

<Preparation of Secondary Battery>

A lithium metal counter electrode was prepared as a positive electrode.

After a polyethylene separator was disposed between each of the negative electrodes and positive electrodes prepared in Examples 1 to 4 and Comparative Examples 1 to 4, an electrolyte solution was injected to prepare secondary batteries of the examples and the comparative examples. A solution, in which vinylene carbonate (VC) was added in an amount of 0.5 wt % to a non-aqueous electrolyte solvent, in which ethylene carbonate (EC) and ethyl methyl carbonate (EMC) were mixed in a volume ratio of 2:8, and 1 M LiPF$_6$ was dissolved, was used as the electrolyte solution.

Charging conditions: CCCV (constant current constant voltage) mode, 0.1 C charge, 5 mV and 1/200 C cut-off
Discharging conditions: CC mode, 0.1 C discharge, 1.5 V cut-off Initial efficiency=(discharge capacity/charge capacity in a 1$^{st}$ cycle)×100

TABLE 2

| | Experimental Example 1 | Experimental Example 2 | |
|---|---|---|---|
| | Adhesion (unit: gf/10 mm) | Discharge capacity (mAh/g) | Initial efficiency (%) |
| Example 1 | 18 | 350 | 93.0 |
| Example 2 | 17 | 350 | 93.0 |
| Example 3 | 19 | 353 | 93.1 |
| Example 4 | 16 | 350 | 93.0 |
| Comparative Example 1 | 13 | 350 | 93.0 |
| Comparative Example 2 | 10 | 350 | 92.7 |
| Comparative Example 3 | 13 | 353 | 93.0 |
| Comparative Example 4 | 22 | 329 | 92.4 |

Referring to Table 2, with respect to the negative electrodes and the secondary batteries which included the negative electrode active materials of Examples 1 to 4, it may be confirmed that initial efficiencies and initial discharge capacities were all improved while electrode adhesions were excellent.

With respect to the negative electrode active materials of Comparative Examples 1 to 3, it may be confirmed that the thermal expansion coefficients of the negative electrode active materials were low, the surface of the artificial graphite particles in the form of a secondary particle was not smooth accordingly, and adhesions were very low.

Also, with respect to Comparative Example 4, since the thermal expansion coefficient of the negative electrode active material was excessively large, it may be confirmed that discharge capacity was very low and initial efficiency was reduced.

Experimental Example 3: Life Characteristics Evaluation

<Preparation of Secondary Battery>

A positive electrode slurry was prepared by mixing Li[Ni$_{0.6}$Mn$_{0.2}$Co$_{0.2}$]O$_2$ as a positive electrode active material, carbon black as a conductive agent, and PVdF, as a binder, in a weight ratio of 94:4:2 and adding N-methylpyrrolidone as a solvent, and the positive electrode slurry was coated on an aluminum foil, vacuum dried at about 130° C. for 8 hours, and rolled to prepare a positive electrode. In this case, the positive electrode was prepared such that a loading of the positive electrode was 3.34 mAh/cm$^2$.

After a polyethylene separator was disposed between each of the negative electrodes prepared in Examples 1 to 4 and Comparative Examples 1 and 2 and the positive electrode, an electrolyte solution was injected to prepare secondary batteries of the examples and the comparative examples. A solution, in which vinylene carbonate (VC) was added in an amount of 0.5 wt % to a non-aqueous electrolyte solvent, in which ethylene carbonate (EC) and ethyl methyl carbonate (EMC) were mixed in a volume ratio of 2:8, and 1 M LiPF$_6$ was dissolved, was used as the electrolyte solution.

<Cycle Capacity Retention Evaluation>

A 300 cycle capacity retention at 45° C. was evaluated for the secondary batteries of Examples 1 to 4 and Comparative Examples 1 and 2.

Specifically, the secondary batteries of Examples 1 to 4 and Comparative Examples 1 and 2 were charged and discharged up to a 300th cycle under charging (CC/CV mode, 1.0 C charge, 4.2V, 0.05 C cut-off) and discharging (CC mode, 1.0 C discharge, 3.0 V cut-off) conditions.

The 300 cycle capacity retention was evaluated by the following equation, and the results thereof are presented in Table 3.

300 cycle capacity retention (%)={(discharge capacity in the 300$^{th}$ cycle)/(discharge capacity in a 1st cycle)}×100

TABLE 3

| | 300 cycle capacity retention (%) |
|---|---|
| Example 1 | 90.0 |
| Example 2 | 89.8 |
| Example 3 | 90.1 |
| Example 4 | 89.5 |
| Comparative Example 1 | 85.7 |
| Comparative Example 2 | 79.9 |

Referring to Table 3, it may be confirmed that the secondary batteries of Examples 1 to 4, in which the thermal expansion coefficients of the negative electrode active materials satisfied the range of the present invention, exhibited significantly improved capacity retentions in comparison to the secondary batteries of Comparative Examples 1 and 2 in which the thermal expansion coefficients of the negative electrode active materials did not satisfy the range of the present invention.

The invention claimed is:

1. A negative electrode active material comprising:
artificial graphite particle in a form of a secondary particle in which a plurality of primary artificial graphite particles are bonded,
wherein a thermal expansion coefficient of the negative electrode active material measured by a method including steps below is in a range of 108×10$^{-6}$/K to 150×10$^{-6}$/K:
(a) mixing the negative electrode active material and a pitch binder in a weight ratio of 90:10, and preparing a mixture pellet having a density of 1.5 g/cc to 2.0 g/cc;
(b) performing thermomechanical analysis on the mixture pellet to obtain a thermal expansion coefficient of the mixture pellet;
(c) preparing a pitch binder pellet having a density of 1.5 g/cc to 2.0 g/cc from the pitch binder, and performing thermomechanical analysis to obtain a thermal expansion coefficient of the pitch binder pellet; and
(d) obtaining the thermal expansion coefficient of the negative electrode active material through Equation 1:

$$A=\{C-(B\times 0.1)\}/0.9 \quad \text{[Equation 1]}$$

wherein, in Equation 1, A is the thermal expansion coefficient of the negative electrode active material, B is the thermal expansion coefficient of the pitch binder pellet, and C is the thermal expansion coefficient of the mixture pellet.

2. The negative electrode active material of claim 1, wherein the primary artificial graphite particles have an average particle diameter (D$_{50}$) of 5 μm to 15 μm.

3. The negative electrode active material of claim 1, wherein a spacing d002 of a (002) plane by X-ray diffraction (XRD) of the artificial graphite particle in the form of the secondary particle is in a range of 0.3357 nm to 0.3361 nm.

4. The negative electrode active material of claim 1, wherein a Brunauer-Emmett-Teller (BET) specific surface area of the negative electrode active material is in a range of 0.3 m$^2$/g to 2.5 m$^2$/g.

5. The negative electrode active material of claim 1, wherein a crystallite size Lc in a c-axis direction of the artificial graphite particle is in a range of 45 nm to 75 nm.

6. The negative electrode active material of claim 1, further comprising sulfur distributed in the primary artificial graphite particles in an amount of 15 ppm to 40 ppm.

7. The negative electrode active material of claim 1, wherein a tap density of the negative electrode active material is in a range of 0.88 g/cc to 1.20 g/cc.

8. The negative electrode active material of claim 1, wherein an average particle diameter (D$_{50}$) of the negative electrode active material is in a range of 10 μm to 30 μm.

9. The negative electrode active material of claim 1, further comprising a carbon coating layer on a surface of the artificial graphite particle.

10. The negative electrode active material of claim 9, wherein the carbon coating layer is present in an amount of 0.1 wt % to 5 wt % in the negative electrode active material.

11. The negative electrode active material of claim 9, wherein the carbon coating layer comprises amorphous carbon.

12. A negative electrode comprising:
a negative electrode current collector; and
a negative electrode active material layer on the negative electrode current collector,
wherein the negative electrode active material layer comprises the negative electrode active material of claim 1.

13. The negative electrode of claim 12, wherein an area ratio I(004)/I(110) during X-ray diffraction analysis of the negative electrode is in a range of 7 to 14.

14. A secondary battery comprising:
   the negative electrode of claim 12;
   a positive electrode facing the negative electrode;
   a separator present between the negative electrode and the positive electrode; and
   an electrolyte.

* * * * *